United States Patent [19]
Briesch

[11] Patent Number: 5,564,269
[45] Date of Patent: Oct. 15, 1996

[54] STEAM INJECTED GAS TURBINE SYSTEM WITH TOPPING STEAM TURBINE

[75] Inventor: Michael S. Briesch, Orlando, Fla.

[73] Assignee: Westinghouse Electric Corporation, Pittsburgh, Pa.

[21] Appl. No.: 225,103

[22] Filed: Apr. 8, 1994

[51] Int. Cl.$^6$ .................... F02C 3/30; F02C 6/18
[52] U.S. Cl. .............. 60/39.05; 60/39.182; 60/39.55
[58] Field of Search ............... 60/39.05, 39.182, 60/39.53, 39.54, 39.55, 39.58, 39.59

[56] References Cited

U.S. PATENT DOCUMENTS

| | | | |
|---|---|---|---|
| 4,785,622 | 11/1988 | Plumley et al. | 60/39.55 |
| 4,948,055 | 8/1990 | Belcher et al. | 60/39.55 |
| 5,170,622 | 12/1992 | Cheng | 60/39.05 |

FOREIGN PATENT DOCUMENTS

| | | |
|---|---|---|
| 0184137 | 6/1986 | European Pat. Off. . |
| 0319699 | 6/1989 | European Pat. Off. . |
| 0439754A1 | 12/1990 | European Pat. Off. . |
| 3331153A1 | 3/1985 | Germany . |
| 1143469 | 2/1969 | United Kingdom . |

OTHER PUBLICATIONS

Proceedings of the American Power Conference, vol. XXVII, 1965, "Future Role of Gas Turbines in Power Generation", Baldwin.

"Effects of Steam Injection . . . ", Journal of Engineering for Power Apr. 1979, vol. 101, pp. 217–227, Fraize et al.

*Primary Examiner*—Louis J. Casaregola
*Attorney, Agent, or Firm*—M. G. Panian

[57] ABSTRACT

A gas turbine power plant having a heat recovery steam generator that generates steam at high and low pressures. The high pressure steam, which is superheated, is partially expanded in a steam turbine, thereby producing shaft power. All of the partially expanded steam is then combined with low pressure steam. The combined steam flow is superheated and then injected into the combustor of the gas turbine to increase power output and reduce NOx.

19 Claims, 3 Drawing Sheets

STEAM INJECTED GAS TURBINE SYSTEM WITH TOPPING STEAM TURBINE

BACKGROUND OF THE INVENTION

The present invention relates to a gas turbine power plant utilizing steam injection and a topping steam turbine. More specifically, the present invention relates to such a gas turbine power plant in which steam is generated in a heat recovery steam generator at higher and lower pressures.

The low capital cost, short lead times and flexibility of gas turbine-based power plants make them particularly attractive to electrical utilities as a means for generating electrical power. Unfortunately, the inefficiency of a gas turbine standing alone, referred to as a simple cycle system, is relatively low compared to conventional fired boiler steam turbine systems.

The major source of this inefficiency is inherent in the Brayton cycle on which the gas turbine operates. The ideal Brayton cycle operates in three phases—first, work is performed on the fluid (air in the case of a gas turbine) by isentropic compression in a compressor; second, heat is added to the fluid isobarically in a combustor; and, third, the hot compressed fluid is isentropically expanded back down to its initial pressure in the turbine. During the expansion phase much of the energy imparted to the fluid as a result of the compression and heating is recovered in the form of useful work. However, a significant portion of the energy remains in a relatively high-temperature, low-pressure form which, as a practical matter, cannot be recovered by further expansion in the turbine. In a simple cycle system this energy is lost to the atmosphere when the gas exhausting from the gas turbine is vented to atmosphere. The magnitude of this energy loss can be appreciated by noting that in a typical simple cycle system, air inducted into the compressor at ambient temperature is heated to a temperature in excess of 1090° C. (2000° F.) in the combustor prior to expansion in the turbine but is only cooled to approximately 540° C. (1000° F.) when vented to atmosphere after expansion in the turbine. Thus, the portion of the fuel burned in the combustor which was used to raise the temperature of the ambient air to 540° C. (1000° F.) is wasted, resulting in poor overall thermodynamic efficiency.

Consequently, substantial effort has been expended in developing methods for recovering the energy available in the gas exhausting from a gas turbine. One of the most successful methods involves the transfer of sensible heat from the hot exhaust gas to pressurized feed water in a heat recovery steam generator (hereinafter HRSG). The HRSG generates steam that is expanded in a steam turbine, thereby producing additional rotating shaft power. Since steam turbines operate on the Rankine cycle, rather than the Brayton cycle, power plants employing such a heat recovery method are termed combined cycle power plants.

Typically, a HRSG is comprised of a large duct through which the exhaust gas flows. The duct encloses banks of tubes through which the water/steam flows and over which the gas turbine exhaust gas flows. The surfaces of the tubes provide heat transfer surfaces. There are three basic components in which heat is transferred in a typical HRSG, each comprised of a bundle of tubes: an economizer in which the feed water is heated to near-saturation temperature; an evaporator in which the water heated in the economizer is converted to steam; and a superheater in which the temperature of the saturated steam from the evaporator is raised into the superheat region.

In order to obtain maximum efficiency of the steam turbine, it is desirable to generate steam at a high temperature and pressure. However, unless supplemental fuel is burned in the exhaust gas, an inefficient practice, the steam temperature is limited to the temperature of the exhaust gas entering the HRSG. The maximum pressure of the steam is also limited by the temperature of the exhaust gas since the saturation temperature of steam increases with its pressure and only the portion of the heat in the exhaust gas which is above the saturation temperature of the water in the evaporator can be used to generate steam. Hence, although increasing steam pressure increases steam turbine efficiency, it also reduces the quantity of the steam generated.

One approach to maximizing heat recovery by steam generation involves the use of a HRSG that generates steam at multiple pressure levels by employing a separate evaporator at each pressure level. The steam generated at each pressure level is then inducted into the appropriate stage of the steam turbine. According to this approach, the gas turbine exhaust gas is directed to the highest pressure evaporator first, then each successive lower pressure level evaporator. Thus, although the temperature of the gas entering the evaporator decreases at each successive pressure level, the saturation pressure (and, hence, saturation temperature of the water) in each successive evaporator is also reduced, so that additional steam may be produced at each pressure level. For example, if steam were generated at three pressure levels, the highest pressure steam is introduced into a high pressure steam turbine, the exhaust from which is combined with steam generated at an intermediate pressure and the combined flow introduced into an intermediate pressure steam turbine. The exhaust from the intermediate steam turbine combines with steam generated at a low pressure and the combined flow introduced into a low pressure steam turbine. The steam is then exhausted from the low pressure steam turbine and condensed and returned to the HRSG. Although this approach results in improved efficiency, the cost and complexity associated with the large intermediate and low pressure steam turbines detracts from its desirability.

Injecting steam into the combustor of a gas turbine has sometimes been used to reduce the NOx generated as a result of the combustion of fuel or to augment the power output of the gas turbine. In the past, such steam injection has been accomplished in a simple cycle gas turbine power plant by generating low pressure steam in a small HRSG and then injecting all of the steam generated into the combustor of the gas turbine. Unfortunately, this approach does not result in the maximum utilization of the heat remaining in the exhaust gas since, at steam low pressure, the exhaust gas is capable of producing more steam than the gas turbine can handle.

In a combined cycle power plant steam injection has been accomplished by generating high pressure steam for the steam turbine and then extracting a portion of the steam mid-way through the turbine and injecting it into the gas turbine combustor. Although this approach increases the recovery of heat from the exhaust gas, such combined cycle plants are complex, involving a large steam turbine, HRSG, condenser, cooling tower, etc., and require a considerable capital investment.

It is therefore desirable to provide an efficient, yet simple and relatively low cost, method of recovering heat from the exhaust gas of a gas turbine by generating steam for injection into the gas turbine.

SUMMARY OF THE INVENTION

Accordingly, it is the general object of the current invention to provide an efficient, yet simple and relatively low cost, method of recovering heat from the exhaust gas of a gas turbine by generating steam for injection into the gas turbine.

Briefly, this object, as well as other objects of the current invention, is accomplished in a method of generating power, comprising the steps of (i) producing power in a first rotating shaft by flowing a hot compressed gas through a first turbine so as to expand the hot compressed gas, thereby producing an expanded gas, (ii) generating a first flow of steam at a first pressure, (iii) generating a flow of steam at a second pressure, the second pressure being greater than the first pressure, (iv) producing power in a second rotating shaft by partially expanding the flow of steam at the second pressure in a second turbine, the flow of steam being expanded from the second pressure down to approximately the first pressure, thereby producing a second flow of steam at the first pressure, and (v) flowing the first and second flows of steam at the first pressure through the first turbine along with the hot compressed gas, thereby increasing the power produced in the first rotating shaft. According to one embodiment, the method further comprises the steps of producing the hot compressed gas to be expanded in the first turbine by compressing air and then burning a fuel in the compressed air in a combustor.

The current invention also encompasses a gas turbine power plant, comprising a steam generator, first and second turbines and a combustor. The steam generator includes (i) means for generating a flow of steam at a first pressure, and (ii) means for generating a flow of steam at a second pressure higher than the first pressure. The first turbine has means for partially expanding the flow of steam at the second pressure, thereby producing an expanded flow of steam. The combustor has means for burning fuel so as to heat compressed air and the first flow of steam and the second flow of steam, thereby producing a moisture laden hot gas. The second turbine has means for expanding the moisture laden hot gas.

DESCRIPTION OF THE PREFERRED EMBODIMENT

Figure 1:
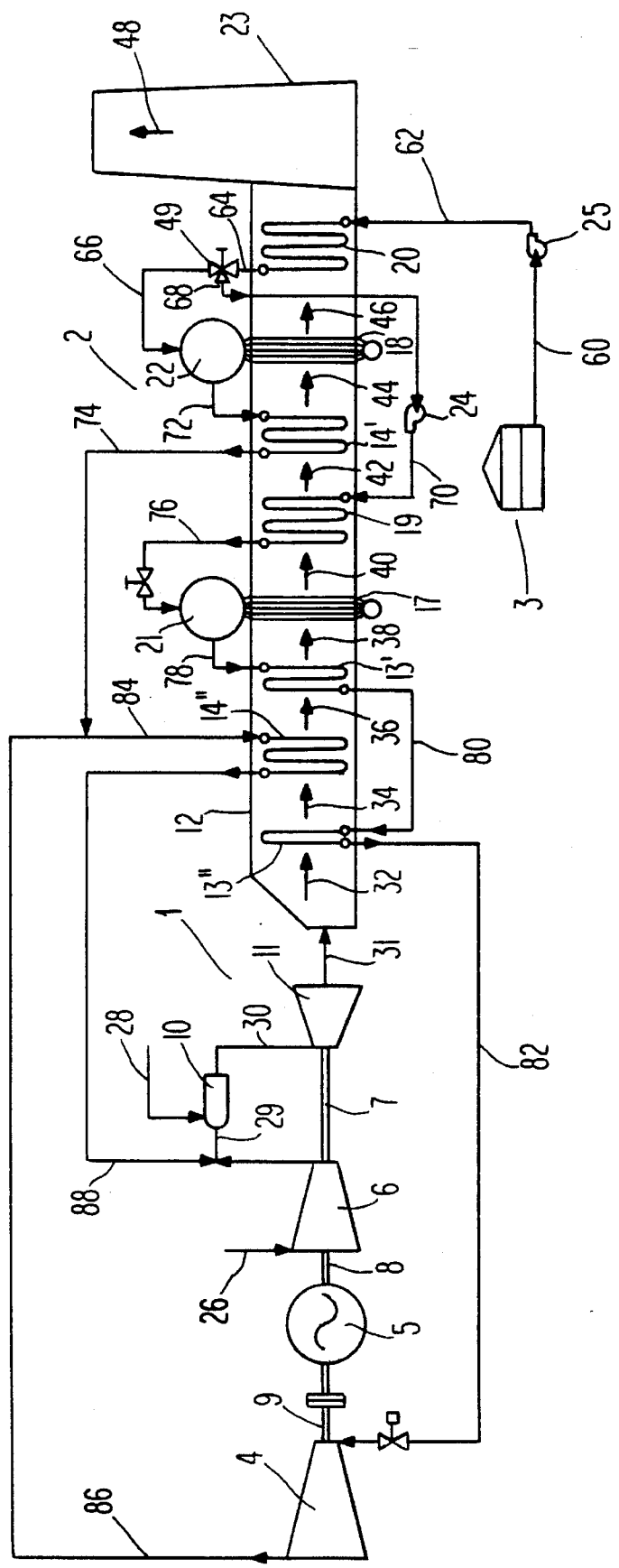
FIG. 1 is a schematic diagram of a gas turbine power plant according to the current invention.

Referring to the drawings, there is shown in FIG. 1 a schematic diagram of a gas turbine power plant according to the current invention. The major components of the power plant include a gas turbine 1, a HRSG 2, a supply of feed water 3, a steam turbine 4, and an electrical generator 5.

The gas turbine 1 is comprised of a compressor 6, a combustor 10, and a turbine 11 that is connected to the compressor by means of a rotating shaft 7. As is conventional, the compressor 6 may include a plurality of alternating rows of rotating blades and stationary vanes. The rotating blades are affixed to discs mounted on the portion of the rotor shaft 7 that extends through the compressor 6 and the stationary vanes are affixed to a casing enclosing the compressor components. Similarly, the turbine 11 may include a plurality of alternating rows of rotating blades and stationary vanes. The rotating blades are affixed to discs that form the portion of the rotor shaft 7 that extends through the turbine 11 and the stationary vanes are affixed to a casing that encloses the turbine components. The combustor 10 may be comprised of a plurality of combustor baskets and associated fuel nozzles.

In the gas turbine 1, ambient air 26 is inducted into the compressor 6. In the preferred embodiment, the compressor 6 increases the pressure of the air 26 into approximately the 1380–1720 kPa (200–250 psia) range. The compressed air 27 from the compressor 6 is then heated in a combustor 10 by burning a fuel 28. The fuel 28 may be in a liquid or gaseous form, and is typically No. 2 distillate oil or natural gas. The fuel 28 may be preheated by the transfer of heat from steam/water from the HRSG 2. In addition to the fuel 28, superheated steam 88, generated as discussed below, is also injected into the combustor 10. The steam injection may be accomplished by mixing the steam 88 into the compressed air 27 prior to its introduction into the combustor 10—for example, by introducing it into the fuel nozzle. Alternatively, the steam 88 may be injected directly into the primary combustion zone of the combustor 10. In the preferred embodiment, sufficient fuel 28 is burned in the combustor 10 to heat the hot gas/steam mixture 30 discharged from the combustor into approximately the 1310°–1370° C. (2400°–2500° F.) temperature range.

The hot moisture laden gas 30 discharged from the combustor 10 is then expanded in the turbine section 11 of the gas turbine 1 down to essentially atmospheric pressure. In so doing, the temperature of the hot gas 30 is considerably reduced. In the preferred embodiment, the temperature of the expanded gas 31 exhausted from the turbine 11 is in the range of approximately 540°–590° C. (1000°–1100° F.). This expansion produces power in the turbine shaft 7 that drives the compressor 5. The excess power not consumed by the compressor 6 drives the electric generator 5, via shaft 8, thereby generating electrical power. As a result of the injection of the steam 88, the mass flow rate of the working fluid flowing through the turbine 11 is increased. Consequently, the power produced in the turbine 11 is considerably greater than it would be if only the air 27 from the compressor were expanded. In addition, as is well known in the art, steam injection reduces the concentration of nitrogen oxides in the exhaust gas that is ultimately discharged to atmosphere, thereby enabling the plant to satisfy local air pollution requirements. In the preferred embodiment, sufficient steam 88 is generated and injected into the combustor 10 to increase the mass flow rate through the turbine 11 by approximately 25%, as compared to dry operation.

The expanded gas 31 is then ducted to the HRSG 2. After leaving the HRSG 2, the cooled exhaust gas 48 is ultimately vented to atmosphere. In the preferred embodiment, the heat transfer in the HRSG 2 reduces the temperature of the exhaust gas 48 into approximately the 90°–150° C. (200°–300° F.) temperature range.

In the preferred embodiment, the HRSG 2 receives feed water 62 and, by transferring heat to it from the expanded gas 31, converts the feed water into steam at two pressure levels. The steam 82 generated at high pressure is partially expanded in a topping steam turbine 4. The partially expanded steam 86 from the steam turbine 4 is then reheated and combined with steam 74 generated at low pressure to form the steam 88 that is injected into the combustor 10 of the gas turbine 1, as previously discussed.

According to an important aspect of the current invention, only the amount of steam that can be generated at high pressure, given the temperature and flow rate of the expanded gas 31, is expanded in the steam turbine 4. The remainder of the heat recovered from the expanded gas 31 is used to generate low pressure steam for steam injection. Thus, although the amount of heat recovered from the expanded gas 31 and returned to the cycle is large, the size (and, hence, the cost) of the steam turbine 4 is much smaller than that of conventional steam bottoming combined cycle plants, in which essentially all of the energy recovered from the expanded gas is returned to the cycle by expansion in a large steam turbine. According to another important aspect of the invention, essentially all of the steam 82 expanded in the steam turbine 4 is ultimately injected into the gas turbine 1. As a result, there is no need for the condensers, cooling towers, etc. that are typically required in a conventional steam bottoming combined cycle power plant.

The method and apparatus for recovering heat from the expanded gas 31 in the HRSG 2, according to the preferred embodiment of the current invention, will now be explained. The HRSG 2 is comprised of a duct 12, which encloses various heat transfer sections (i.e., superheaters, evaporators and economizers), and an exhaust stack 23. As is conventional, the heat transfer sections may be comprised of multiple rows of finned heat transfer tubes, the number of rows being determined by the amount of heat transfer surface area desired. The water/steam flows within the tubes and the expanded gas 31 flows over the outside surfaces of the tubes.

The heat transfer sections include high and low pressure superheaters 13 and 14, respectively. The high pressure superheater 13 is comprised of first and second sections 13' and 13", respectively Similarly, the low pressure superheater 14 is also comprised of first and second sections 14' and 14", respectively In the preferred embodiment, the second low pressure superheater section 14" is disposed between the first and second high pressure superheater sections, 13' and 13", respectively The heat transfer sections also include high and low pressure evaporators 17 and 18, respectively, which may be of the forced or natural circulation type, and high and low pressure economizers 19 and 20, respectively.

The heat transfer sections are arranged to optimize the recovery of heat from the expanded gas 31. Thus, the expanded gas 31 flows first over the second section of the high pressure superheater 13", then over the second section of the low pressure superheater 14", then over the first section of the high pressure superheater 13', then over the high pressure evaporator 17, then over the high pressure economizer 19, then over the first section of the low pressure superheater 14', then over the low pressure evaporator 18, and, finally, over the low pressure economizer 20.

In operation, feed water 60 from a feed water supply 3 is pressurized to a relatively low pressure (i.e.,less than approximately 3450 kPa (500 psia)) by a pump 25. The pressurized feed water 62 is then directed to the low pressure economizer 20. Alternatively, the feed water 62 may be preheated by mixing it with water drawn from the low pressure drum 22.

The low pressure economizer 20 has sufficient heat transfer surface area to heat the feed water 62 to close to its saturation temperature by the transfer of heat from the expanded gas 46 flowing over the economizer. In order to maintain maximum heat recovery, it is desirable to transfer as much heat as possible in the economizer. However, the temperature of the water must remain below its saturation temperature to avoid steam formation, which impedes the flow of water through the economizer. In the preferred embodiment the water in the low pressure economizer 20 is heated to approximately 5° C. (10° F.) below its saturation temperature.

The heated feed water 64 discharged from the low pressure economizer 20 is then split into first and second streams 66 and 68, respectively, by flow control valve 49. As discussed below, the first feed water stream 66 is used to generate low pressure steam 74 for injection into the gas turbine 1, while the second feed water stream 68 is used to generate high pressure steam 82 for partial expansion in the steam turbine 4 followed by injection into the gas turbine. In the preferred embodiment, the ratio of high pressure steam 82 to low pressure steam 74 is at least approximately two and preferably in the range of three to four.

The first feed water stream 66 is directed to the low pressure steam drum 22, from which it is circulated through the low pressure evaporator 18 and converted to low pressure saturated steam 72 by the transfer of heat from the expanded gas 44 flowing over the evaporator. In the preferred embodiment, the pressure in the low pressure evaporator 18 is maintained as low as possible so as to maximize the amount of heat in the expanded gas 44 that can be recovered. By lowering the saturation temperature of the steam in the evaporator, the amount of heat in the expanded gas that is above the saturation temperature and, therefore, the amount of heat that can be recovered by the generation of steam, is maximized. Preferably, the pressure in the low pressure evaporator 18 is maintained at less than approximately 350 kPa (50 psi), and more preferably only approximately 100 kPa (15 psi), above the pressure of the compressed air 27 discharged from the compressor 6 so that no further pressurization is required to allow the steam 88 to be injected into the combustor 10 (preferably, the pressure drop experienced by the steam flowing through the low pressure superheater 14 is only about 15 psi or less). Thus, in the preferred embodiment, the pressure in the low pressure evaporator 18 is maintained at less than approximately 3450 kPa (500 psia), and most preferably in the range of approximately 1480–2070 kPa (215–300 psia).

From the steam drum 22, the low pressure saturated steam 72 is superheated in the first section of the low pressure superheater 14' by the transfer of heat from the expanded gas 42 flowing over this superheater section. In the preferred embodiment, the first low pressure superheater section 14' has sufficient heat transfer surface area to superheat the steam 74 into approximately the 260°–310° C. (500°–600° F.) temperature range.

The second stream of heated feed water 68 from the low pressure economizer 20 is further pressurized by pump 24 to a pressure in excess of 6900 kPa (1000 psia), and preferably at least 13,800 kPa (2000 psia). The further pressurized feed water 70 is then directed to the high pressure economizer 19. The high pressure economizer 19 has sufficient heat transfer surface area to heat the feed water 70 to close to its saturation temperature by the transfer of heat from the expanded gas 40 flowing over the economizer. In the preferred embodiment, the water in the high pressure economizer 19 is heated to approximately 11° C. (20° F.) below the saturation temperature of the steam in the high pressure drum 21.

The heated feed water 76 from the high pressure economizer is then directed to the steam drum 21, from which it is circulated through the high pressure evaporator 17 and converted to high pressure saturated steam 78 by the transfer of heat from the expanded gas 38 flowing over the evaporator. In the preferred embodiment, the pressure in the high pressure evaporator 17 is maintained above 6890 kPa (1000 psia), and preferably in the range of approximately 9650–11,000 kPa (1400–1600 psia). Generating steam at such high pressures maximizes the power produced in the steam turbine 4.

From the steam drum 21, the high pressure saturated steam 78 is superheated in the first section of the high pressure superheater 13' by the transfer of heat from the expanded gas 36 flowing over this superheater section. The steam 80 from the first high pressure superheater section 13' is then further superheated in the second section of the high pressure superheater 13" by the transfer of heat from the expanded gas 32 flowing over that superheater section. In the preferred embodiment, the high pressure superheater sections 13' and 13" have sufficient heat transfer surface area to superheat the steam 82 into the approximately 480°–570° C. (900°–1050° F.) temperature range.

In the steam turbine 4, the superheated high pressure steam 82 is partially expanded down to the pressure of the low pressure superheated steam 74 (i.e., to less than 3450 kPa (500°psia), and preferably in the range of approximately 1480–2070 kPa (215–300 psia), as previously discussed). In so doing, the steam turbine 4 produces power that, via shaft 9, further drive the electric generator 5 so as to increase the electrical power output from the power plant. The partially expanded steam 86 discharged from the steam turbine 4 is then mixed with the low pressure superheated steam 74 from the low pressure superheater first section 14'. The combined flow of low pressure steam 84 is then superheated in the second section of the low pressure superheater 14" by the transfer of heat from the expanded gas 34 flowing over that superheater section. In the preferred embodiment, the second low pressure superheater section 14" has sufficient heat transfer surface area to superheat the steam 88 into the approximately 540°–570° C. (1000°–1050° F.) temperature range. The superheated low pressure steam 88 is then injected into the gas turbine 1 to increase the power output of the turbine 11 and reduce the generation of NOx, as previously discussed. Since the hot moisture laden gas 30 that expands through the turbine section 11 of the gas turbine 1 is heated to a temperature in excess of 1090° C. (2000° F.), superheating the steam 88 reduces the amount of fuel 28 that must be burned in the combustor 10 to heat the gas 30 to the desired temperature for expansion in the turbine 11.

Figure 2:
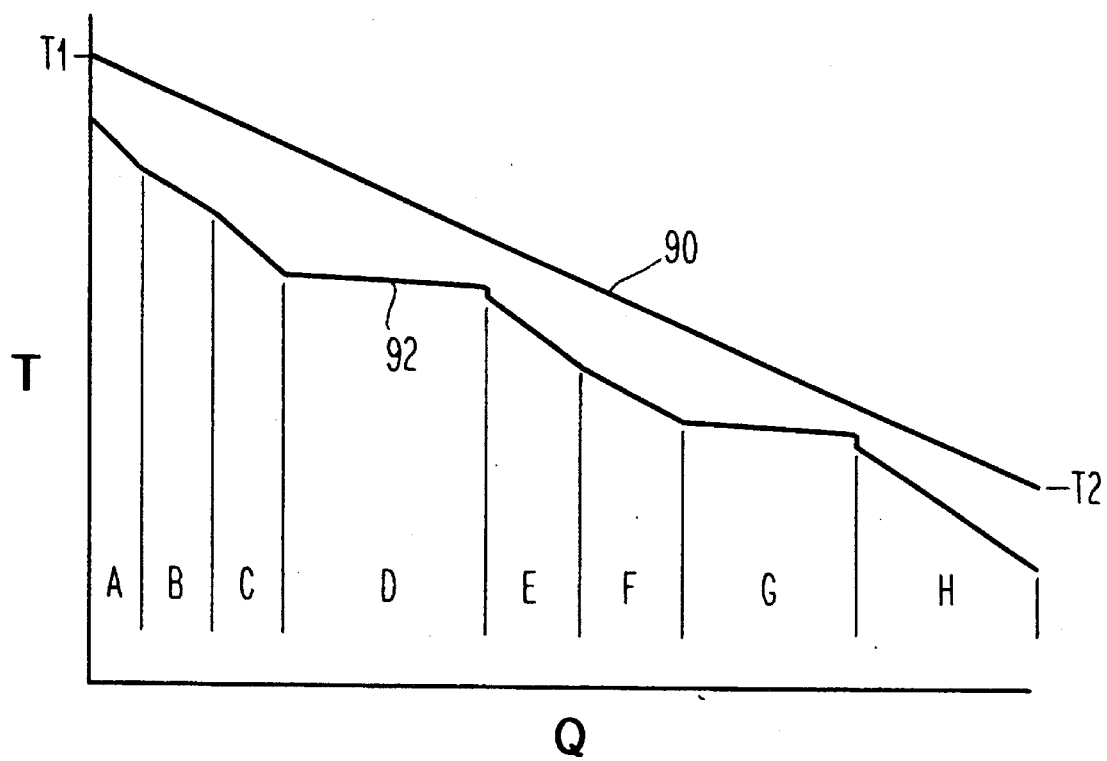
FIG. 2 is a heat transfer diagram for the HRSG shown in FIG. 1.

As the foregoing indicates, the ordering of the various HRSG 2 components with respect to the flow of the expanded gas has been chosen so that heat may be extracted by each component, even though the temperature of the expanded gas 31 is decreasing as it flows through the HRSG. This is illustrated in FIG. 2, which is a heat transfer diagram for the HRSG 2. The axes of the diagram are temperature, denoted T, and heat transfer, denoted Q. The upper line 90 represents the heat released from the expanded gas 31 as it flows through the HRSG 2. The gas enters the HRSG at temperature T1 (approximately 540°–590° C. (1000°–1100° F.) in the preferred embodiment) and discharges from the HRSG at temperature T2 (approximately 90°–150° C. (200°–300° F.) in the preferred embodiment). The lower line 92 represents the heat absorbed by the feedwater/steam. Each segment of the lower line represents heat transfer in one of the HRSG components. Thus, area A of the graph represents the heat transfer in the second section of the high pressure super heater 13", area B represents the heat transfer in the second section of the low pressure super heater 14", area C represents the heat transfer in the first section of the high pressure super heater 13', area D represents the heat transfer in the high pressure evaporator 17, area E represents the heat transfer in the high pressure economizer 19, area F represents the heat transfer in the first section of the low pressure superheater 14', area G represents the heat transfer in the low pressure evaporator 18, and area H represents the heat transfer in the low pressure economizer 20.

As can be seen, the operating pressure (and hence saturation temperature) and the steam generation rate at each boiler section is selected to maintain a sufficient temperature gradient between the exhaust gas and steam/water flow to ensure good heat transfer.

Figure 3:
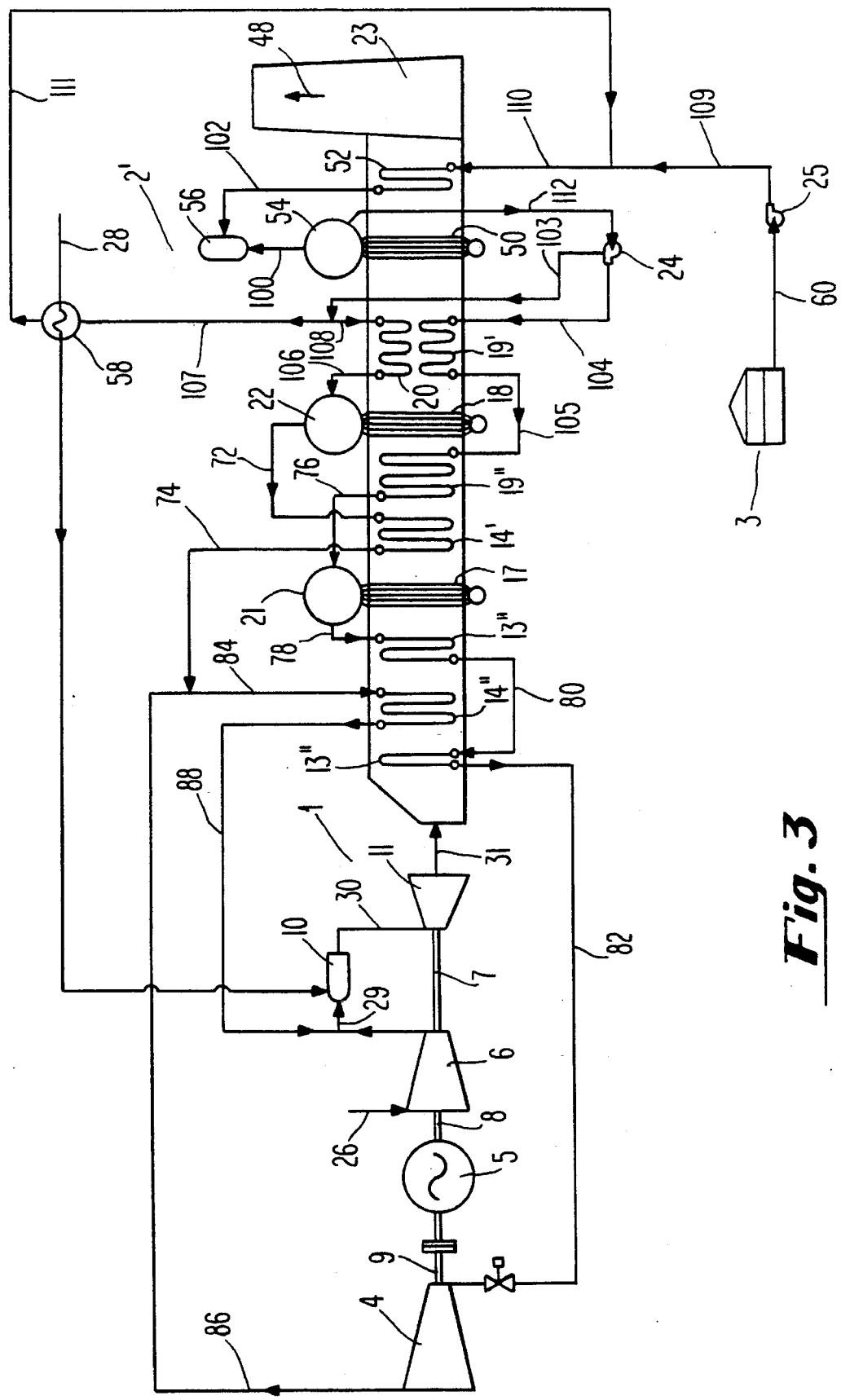
FIG. 3 is a schematic diagram of an alternate embodiment of the gas turbine power plant according to the current invention.

FIG. 3 shows an alternate embodiment of the current invention incorporating a somewhat different arrangement in the cooler end of the HRSG 2'. In this embodiment, the feed water 109 from the feed water supply 3 is mixed with water 111 discharged from a fuel heater 58 and the combined flow 110 is then heated in an economizer 52. The heated feed water 102 from the economizer 52 is supplied to a deaerator 56. The deaerator 56 is coupled to an evaporator 50, via a steam drum 54, that produces very low pressure steam 100. In the preferred embodiment, the steam 100 is at a pressure of only approximately 250 kPa (35 psia). The very low pressure steam 100 is directed to the deaerator 56 in which, using techniques well known in the art, the feed water 102 is heated and deaerated.

From the steam drum 54, the deaerated feed water 113 is divided into two streams 103 and 104. Stream 104 is pressurized by pump 24 to a pressure in excess of 6900 kPa (1000 psia), as before. However, in this embodiment, the high pressure economizer 19 has been divided into first and second sections 19' and 19", respectively, with the first section 19' being disposed downstream, in terms of the flow of hot gas 31, from the low pressure evaporator 18 and the second section 19" being disposed upstream of the low pressure evaporator 18. Further, in this embodiment, the first low pressure superheater section 14' is disposed upstream of the second high pressure economizer section 19".

The pressurized heated feed water 105 from the first high pressure economizer section 19' subsequently flows through the second high pressure economizer section 19" and then into the high pressure steam drum 21 and evaporator 17, which operate as before.

The other stream 103 of deaerated feed water from the steam drum 54 is preferably discharged from pump 24 at an interstage take-off thereof so that it is not pressurized to as high a level as stream 104. Thereafter, stream 103 is divided into two streams 107 and 108. Stream 108 flows through the low pressure economizer 20 and then to the low pressure steam drum 22 and evaporator 18, which operate as before. The other stream 107 is directed to a fuel heater 58 that it heats the fuel 28 before it is delivered to the combustor 10 (the fuel 28 may also be heated using compressed air drawn from the compressor 6 for purposes of cooling the turbine 11). The water 111 discharged from the fuel heater 58 is then mixed into the water 109 from the feed water supply 3, as previously discussed.

The present invention may be embodied in other specific forms without departing from the spirit or essential attributes thereof and, accordingly, reference should be made to the appended claims, rather than to the foregoing specification, as indicating the scope of the invention.

I claim:

1. A method of generating power, comprising the steps of:

a) producing power in a first rotating shaft by flowing a hot compressed gas through a first turbine so as to expand said hot compressed gas, thereby producing an expanded gas;

b) generating a first flow of steam at a first pressure;

c) generating a flow of steam at a second pressure, said second pressure being greater than said first pressure;

d) producing power in a second rotating shaft by partially expanding said flow of steam at said second pressure in a second turbine, said flow of steam being expanded from said second pressure down to approximately said first pressure, thereby producing a second flow of steam at said first pressure;

e) reheating said second flow of steam at said first pressure after said expansion in said second turbine; and f) flowing said first and second flows of steam at said first pressure through said first turbine along with said hot compressed gas, thereby increasing the power produced in said first rotating shaft.

2. The method according to claim 1, further comprising the steps of producing said hot compressed gas to be expanded in said first turbine by compressing air and then burning a fuel in said compressed air in a combustor.

3. The method according to claim 2, wherein the step of flowing said first and second flows of steam at said first pressure through said first turbine comprises injecting said first and second flows of steam at said first pressure into said combustor.

4. The method according to claim 2, wherein the step of flowing said first and second flows of steam at said first pressure through said first turbine comprises injecting said first and second flows of steam at said first pressure into said compressed air prior to said burning of said fuel therein.

5. The method according to claim 2, wherein said second pressure is at least 1000 psia and said first pressure is less than 500°psia.

6. The method according to claim 5, wherein said first pressure is within the range of approximately 215–300 psi.

7. The method according to claim 5, wherein the difference between said second pressure and the pressure of said compressed air in which said fuel is burned is less than 50 psi.

8. The method according to claim 1, wherein the step of generating said first flow of steam at said second pressure and the step of generating said flow of steam at said second pressure each comprise transferring heat from said expanded gas to water.

9. The method according to claim 1, further comprising the step of superheating said flow of steam at said second pressure prior to said expansion down to said first pressure, said superheating being accomplished by transferring heat from said expanded gas to said steam.

10. The method according to claim 1, wherein the step of said reheating said second flow of steam comprises transferring heat from said expanded gas to said steam.

11. The method according to claim 1, further comprising the step of superheating said first flow of steam at said first pressure prior to flowing said steam through said first turbine.

12. A method of generating power, comprising the steps of:

a) compressing air in a compressor, thereby producing compressed air;

b) burning fuel in said compressed air in a combustor, thereby producing a hot compressed gas;

c) expanding said hot compressed gas in a first turbine having a first rotating shaft, thereby producing power in said first rotating shaft and an expanded gas;

d) pressurizing a flow of feed water, thereby producing a flow of pressurized feed water;

e) generating a first flow of steam in a first evaporator by transferring heat from said expanded gas to at least a first portion of said flow of pressurized feed water;

f) further pressurizing a second portion of said flow of pressurized feed water, thereby producing a flow of further pressurized feed water;

g) generating a second flow of steam in a second evaporator by transferring heat from said expanded gas to said flow of further pressurized feed water;

h) superheating said second flow of steam in a first superheater, said superheating accomplished by transferring heat from said expanded gas to said second flow of steam;

i) expanding said second flow of steam in a steam turbine having a second rotating shaft, thereby producing power in said second rotating shaft and an expanded flow of steam;

j) reheating said expanded flow of steam, said reheating accomplished by transferring heat from said expanded gas to said expanded flow of steam; and k) introducing said first flow of steam from said first evaporator and said expanded flow of steam from said steam turbine into said combustor.

13. The method according to claim 12, further comprising the step of superheating said first flow of steam prior to said introduction into said combustor in said second superheater, said superheating accomplished by transferring heat from said expanded gas to said first flow of steam.

14. The method according to claim 13, wherein said second superheater is disposed between first and second portions of said first superheater.

15. The method according to claim 13, further comprising the steps of:

a) heating said first portion of said flow of pressurized feed water in a first economizer prior to said transfer of said heat thereto from said expanded gas in said first evaporator; and b) heating said flow of further pressurized feed water in a second economizer prior to said transfer of said heat thereto from said expanded gas in said second evaporator.

16. The method according to claim 15, wherein said expanded gas transfers heat first to a first portion of said first superheater, then to a first portion of said second superheater, then to said second evaporator, then to said second economizer, then to said first evaporator, and then to said first economizer.

17. A method of generating power, comprising the steps of:

a) producing a hot compressed gas by compressing air and then burning a fuel in said compressed air in a combustor;

b) producing power in a first rotating shaft by flowing said hot compressed gas through a first turbine so as to expand said hot compressed gas, thereby producing an expanded gas;

c) generating a first flow of steam at a first pressure of less than 500 psia;

d) generating a flow of steam at a second pressure of at least 1000 psia;

e) producing power in a second rotating shaft by partially expanding said flow of steam at said second pressure in a second turbine, said flow of steam being expanded from said second pressure down to approximately said first pressure, thereby producing a second flow of steam at said first pressure; and f) flowing said first and second flows of steam at said first pressure through said first turbine along with said hot compressed gas, thereby increasing the power produced in said first rotating shaft.

18. The method according to claim 17, wherein said first pressure is within the range of approximately 215–300 psia.

19. The method according to claim 17, wherein the difference between said first pressure and the pressure of said compressed air in which said fuel is burned is less than 50 psi.

* * * * *